Dec. 13, 1932.  T. R. HARRISON  1,891,155
METERING
Filed Aug. 2, 1926
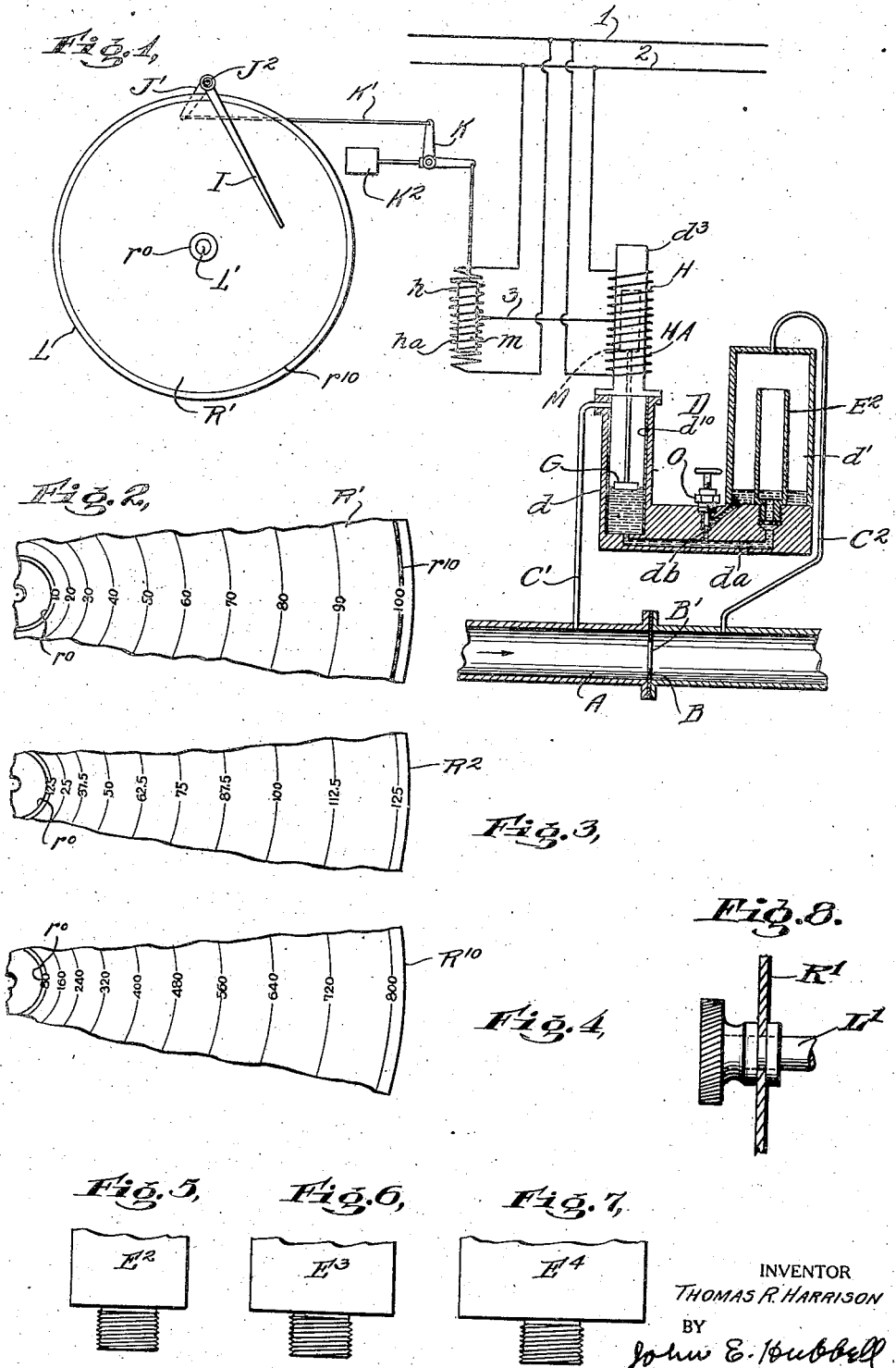
INVENTOR
THOMAS R. HARRISON
BY
John E. Hubbell
ATTORNEY Patented Dec. 13, 1932

1,891,155

UNITED STATES PATENT OFFICE

THOMAS R. HARRISON, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

METERING

Application filed August 2, 1926. Serial No. 126,562.

My present invention consists in improvements in the metering art devised with the general object of cheapening the cost of production and reducing the number of parts required for the production of a series of metering units collectively adapted to cover a wide range of capacity or other conditions of use, some one portion of which range may be covered more advantageously by some one, than by any other unit in the series. The invention is of especial utility for use, or in connection with apparatus for measuring fluid rates of flow, but in its more general aspects the invention is not restricted to such use.

The object of my present invention, more specifically stated, is to facilitate the practical utilization of the principle that, other things being equal, in any particular use better metering results are obtained with a meter of such capacity that practically its full scale range is employed, than are obtainable in the same use with a meter of greater capacity. For example, a flow meter capable of measuring a flow varying from zero to 1000 lbs. of fluid flowing per minute is, other things being equal, a more effective meter for measuring flows up to 1000 lbs. per minute, than is a meter capable of measuring flows varying from zero to 10,000 lbs. per minute, and is a less effective meter for flows varying from zero to 100 lbs. per minute, than is a meter capable of measuring a flow varying only between the limits of zero and 100 lbs. per minute.

The invention is characterized by the provisions of, and by the mode of providing, standard scaled record sheets or other meter scale parts, and other standard metering parts or devices so relatively proportioned and designed that by selective combinations of said standard parts with other parts used alike in all the units, I may produce a plurality of metering units which are all alike in general construction, but each of which differs from the others in the range or condition of use for which it is best adapted.

In a preferred practical mode of constructing a line, or series of recording flow meters, each of which is well adapted to measure a fluid rate of flow different from that which can be measured with equal advantage by other meters of the line, I employ exactly the same type of recorder in each of the meters, but actuate the recorder in each meter by a manometer element which, because of its form or by reason of its adjustment, permits a practically full scale deflection of the recorder to be secured by impressing on said manometer element a differential pressure which is different from that which must be impressed upon the manometer of each other meter in the series to secure full scale deflection. The differences in the differential pressures required for full scale recorder deflections in the different meters are predetermined and are so correlated with the scales of a set of scaled record sheets or charts provided for interchangeable use in the recorders that with each manometer or manometer adjustment, some one of the charts will correctly and directly indicate the value of the flow creating a pressure differential then impressed upon the manometer, provided that pressure differential results from the flow through a suitably chosen orifice plate, Venturi tube section, or the like. In practice, moreover, the charts and manometers, or manometer adjustments are so correlated with one another and with a plurality of different orifice plates or like flow restricting devices, that some one of the charts will correctly indicate the flow when the pressure differential impressed on the corresponding manometer is created by fluid flow through any one of a number of orifices of definitely different diameters.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described preferred embodiments of my invention.

Of the drawing:

Fig. 1 is a somewhat diagrammatic elevation partly in section of a recording flow meter;

Figs. 2, 3, and 4 are elevations each of a portion of a different one of a series of interchangeably usable charts, any one of which may be employed in the apparatus shown in Fig. 1;

Figs. 5, 6 and 7 are diagrammatic views each illustrating a different one of a series of interchangeably useable manometer parts, any one of which may be employed in the apparatus shown in Fig. 1; Fig 8 is an elevation illustrating means for securing a chart disc to a rotating chart support.

In the drawing I have illustrated the use of my invention in measuring the fluid rate of flow through a conduit A with apparatus comprising a manometer D of the U-tube type to the legs $d$ and $d'$ of which the pressures at the high and low pressure sides of an orifice plate B' in the conduit A, are respectively transmitted by pipes C' and $C^2$. The manometer D comprises a float G floating on the surface of the mercury or other sealing liquid in the manometer leg $d$. The vertical movements of the float G, as the relative amounts of the sealing liquid in the legs $d$ and $d'$ vary with the flow through the conduit A, are transmitted by any usual or suitable means to the recording arm I of a recorder L.

The transmitting means shown includes an impedance bridge comprising a pair of end to end coils H and HA surrounding an upper tubular non-magnetic portion $d^3$ of the manometer leg $d$ which encloses a magnetic body or core M carried at the top of a stem portion of the float G. The impedance bridge also includes a pair of end to end coils $h$ and $ha$. The coils H and HA are connected in series between alternating current supply mains 1 and 2, and the coils $ha$ and $h$ are also connected in series between the mains 1 and 2. A conductor 3 connects the common terminals of the coils H and HA to the common terminals of the coils $h$ and $ha$. The latter are so wound and connected to the supply conductors 1 and 2 that both coils are energized in the same directions; i. e. the adjacent ends of the two coils $h$ and $ha$ are of opposite polarity. Movable axially of the coils $h$ and $ha$ is a magnetic body or core $m$ connected by a lever K and link K' to a crank arm J' secured to a rock shaft $J^2$ which carries the recording arm I. The movable system including the core $m$ and recording arm I is balanced against the action of gravity by a counter-balance weight $K^2$.

With the described arrangement, the impedance bridge is balanced, and the system is in equilibrium when the cores M and $m$ are in such positions relative to the coils surrounding them, that the ratio of the inductances of the coils $ha$ and $h$ is equal to the ratio of the inductances of the coils H and HA, and any movement of the core M disturbing the equilibrium, results in a corresponding movement of the core $m$ in the opposite direction which restores the equilibrium.

The recorder L comprises a shaft L' driven by an electric clock or like timing motor (not shown) and rotating at a constant speed a record chart shown as the hereinafter mentioned chart R', and in the form of a disc of paper having suitable scale markings, and on which a curve is traced by the arm I as the shaft L' is rotated. The chart disc R' may be secured to the shaft L' in any usual manner, as by clamping it between a hub or collar portion of the shaft L' and a clamping nut screwed on the threaded portion of the shaft in front of the collar as shown in Fig. 8.

In the operation of the apparatus shown in Fig. 1, the full range of movement of the marking arm I across the record chart R' extends between the small inner circle $r^0$ followed by the arm I when no fluid is flowing through the conduit A, and a large outer circle $r^{10}$ which is adjacent the periphery of the record chart and is followed by the marking arm when the flow through the conduit A is continuously maintained at the maximum value which the apparatus is capable of measuring. The position of the arm I depends on the position of the float G and the position of the latter depends directly upon the differential between the pressures transmitted to the two legs $d$ and $d'$ of the manometer D, and upon the relative cross section of the mercury receiving spaces in the manometer legs $d$ and $d'$. While a given pressure differential impressed on the manometer D, will always result in the same difference between the mercury levels in the legs $d$ and $d'$, the change of mercury level in the leg $d$ produced by a given differential may be increased or decreased by increasing or decreasing the cross sectional area of the mercury space in the leg $d$ relative to the cross sectional area of the mercury space in the leg $d'$.

With a given rate of flow of a fluid of given density through a conduit A, the pressure differential transmitted by the pipes C' and $C^2$ to the manometer D will increase or decrease accordingly as the orifice B' in the orifice plate B is decreased or increased.

While some latitude in the size of the orifice B' in the orifice plate B is possible, the capacity for adjustment of the apparatus in this manner is limited, since ordinarily if the orifice diameter be less than 40% of the pipe diameter, the pipe is objectionably restricted, and if the orifice diameter is made more than 70% of the pipe diameter the accuracy of the apparatus is objectionably impaired. The best results are ordinarily obtained with an orifice the diameter of which is approximately 60% of the diameter of the conduit A.

It is practically feasible, however, to very materially vary the displacement of the float G due to any given pressure differential impressed on the manometer, by varying the relative cross sectional areas of the mercury receiving spaces in the manometer legs $d$ and $d'$. In the construction illustrated, these adjustments are obtained by the use of a suitable set of tubular parts $E^2$, $E^3$, $E^4$, etc. which are adapted to be interchangeably mounted in the leg $d'$ of the manometer. The parts $E^2$, $E^3$, $E^4$, etc. differ from one another essentially only in that the diameter of the cylindrical space extending upward from the lowermost mercury level in the manometer leg $d'$ is definitely different in the different parts. As shown, each of the members $E^2$, $E^3$, $E^4$, etc. is formed at its lower end with an externally threaded nipple adapted to be screwed into a threaded socket formed in the body of the manometer D, and from the bottom of which a channel $da$ leads to the bottom of the mercury space in the manometer leg $d$. The parts $E^2$, $E^3$, $E^4$, etc., may be aptly called range tubes since the internal cross sectional area of each tube determines the range of the pressure differential impressed on the manometer in which the tube is mounted, between the zero value of that differential and the value of the differential required to give full scale deflection to the deflecting arm I of the recorder or exhibitor L which is operated by the manometer in accordance with the pressure differential impressed on and actuating the manometer.

In the preferred form of carrying out the present invention the manometer adjustment in which the full float displacement is produced by the smallest pressure differential, is obtained by admitting mercury displaced from the leg $d$ into the space within the leg $d'$ surrounding the tubular part $E^2$, $E^3$, or $E^4$, etc. then in use, as well as into the space within said tubular part. To this end I provide a valve seated port $db$ opening from the passage $da$ to the outer portion of the chamber space in the leg $d'$. The valve O forms a means by which the port $db$ can be closed when all the displaced mercury is to be passed into the selected one of the tubular parts $E^2$, $E^3$, $E^4$, etc. then in place. In practice the valve O should be closed to readjust the manometer only when the mercury levels in the legs $d$ and $d'$ are the same so that a definite portion of the mercury will always be trapped above the valve O when the latter is closed. To permit the effective use of the manometer with the valve O open, regardless of which of the tubular parts $E^2$, $E^3$, $E^4$, etc. is then in place, the mercury contacted walls of the different parts $E^2$, $E^3$, $E^4$, etc. should be the same for each part, so that with the valve open and the same mercury level in the leg $d'$, each of the parts $E^2$, $E^3$, $E^4$, etc. will displace the same amount of mercury.

The record sheets $R'$, $R^2$, $R^3$, etc. are so related to one another that a fixed ratio exists between the ranges or maximum flow values which it is possible to indicate on any two successive charts, and are so related to the manometer adjustments obtained with the valve O and devices $E^2$, $E^3$, and $E^4$, that with any one manometer adjustment in use, some one of the scale charts $R'$, $R^2$, $R^3$, etc. is adapted to give correct readings of the flow through the conduit orifice plate $B'$ in use.

In a preferred mode of forming the charts $R'$, $R^2$, $R^3$, etc. the latter are so related that the common logarithms of the numbers representing the maximum flow values or ranges of successive charts differ by the same fractional increment, which is of such value that when multiplied by the number of charts in the series, the product is unity. That is to say, if the logarithm increment is $\frac{1}{6}$ there will be 6 charts in the series, and if the logarithm increment is $\frac{1}{10}$ there will be 10 charts in the series. From a practical standpoint, I prefer to use a logarithm increment of $\frac{1}{10}$ so that there are 10 charts in a series. Assume, for example, that the most coarsely scaled chart in the series has a maximum flow or scale range of 100 units of flow, and that there are 10 charts $R'$, $R^2$–$R^{10}$, in a series, then the relations between the different charts are given in the table below, wherein the column A contains the identifying symbol of the chart, the column B contains the common logarithms of the numbers corresponding to the maximum flow or scale range of the various charts, and column C contains the said maximum flow or scale range numbers.

| A | B | C | D |
|---|---|---|---|
| $R'$ | 2.00 | 100.0 | 100 |
| $R^2$ | 2.10 | 125.9 | 125 |
| $R^3$ | 2.20 | 158.5 | 160 |
| $R^4$ | 2.30 | 199.5 | 200 |
| $R^5$ | 2.40 | 251.2 | 250 |
| $R^6$ | 2.50 | 316.2 | 320 |
| $R^7$ | 2.60 | 398.1 | 400 |
| $R^8$ | 2.70 | 501.2 | 500 |
| $R^9$ | 2.80 | 631.0 | 630 |
| $R^{10}$ | 2.90 | 794.3 | 800 |
| $R^{11}$ | 3.00 | 1000.0 | 1000 |
| $R^{12}$ | 3.10 | 1259.0 | 1250 |
| $R^{13}$ | 3.20 | 1585.0 | 1600 |
| $R^{14}$ | 3.30 | 1995.0 | 2000 |
| etc. | etc. | etc. | etc. |

In the table given above the charts $R'$ to $R^{10}$ constitute one complete series, and the chart $R^{11}$ starts a second series. The maximum quantity which can be indicated on chart $R^{11}$ will be 1000; i. e. 10 times the maximum value which can be indicated on the chart $R'$. Similarly, the maximum value which can be indicated on the chart $R^{12}$ is 10 times that which can be indicated on the chart $R^2$. Actually, the scale lines $r'$, $r^2$, $r^3$, etc. on the chart $R^{11}$ may be identical with those on the chart $R'$, and the scale markings on any chart in the second series may be formed by adding a cypher to those on the corresponding chart in the first series. In consequence, a multiplicity of series of 10 charts each can be printed from the same plates, and the charts of one series can be converted into charts of a higher series by merely adding cyphers to multiply the scale values of the original series by 10, or by 100, or by 1000, etc.; or by the use of decimal points and cyphers the original scale values may be multiplied by one or another of the series of fractions—.1, .01, .001, etc.

It is undesirable, in practice, to have the maximum scale values on the charts represented by odd or fractional numbers, and the maximum scale values on the different charts $R'$, $R^2$, and $R^3$ advantageously may be expressed in rounded numbers such as those indicated in column D of the foregoing table. With the rounded maximum scale values given in column D, the maximum value scale circles marked on the different charts cannot all coincide, but if the largest of these circles coincides with the largest circle, $r^{10}$, which the arm I can follow, the full scale range of each of the charts is utilizable. It will be understood that the use of such a rounded maximum scale value line on a chart does not change the scale of the chart or reduce the maximum flow value theoretically possible of indication on the chart, and does not modify in any way the ratio between the maximum flow values which may be represented on each of two successive charts by the line traced by the arm I when the latter is in its maximum flow position. When the maximum flow line which can be traced by the arm I on any particular chart lies outside of the rounded maximum scale line appearing on the chart, the practical result is merely that the scale markings on the chart do not readily indicate values lying within the minute and practically insignificant range between said lines. When the rounded maximum flow scale line on the chart lies outside of the maximum flow line which the arm I can trace on the chart, the practical result is merely that the minute and practically insignificant portion of the scale range lying outside of the last mentioned line is ineffective and cannot be actually utilized.

In considering the relative proportioning of manometer adjustments and record charts it is convenient to regard the manometer D with one of the parts $E^2$, $E^3$, $E^4$, etc., in place, and with its valve O open as one manometer, and that a separate manometer is formed by closing the valve O, and that a separate manometer is also formed when the valve O is closed whenever any one of the parts $E^2$, $E^3$, $E^4$, etc. then in place in the manometer D is replaced by another of said parts. The series or set of manometers so formed are so proportioned that when successively used in measuring the flow of liquid of the same density through the same orifice of the proper diameter for use with said manometers, the maximum change in float elevations with any two successive manometers in the set will correspond to the maximum flows or scale ranges which can be recorded by the corresponding two successive ones of the charts $R'$, $R^2$, $R^3$, etc. This requires that the ratio between the pressure differentials which must be impressed upon any two successive manometers in the set to secure maximum changes in manometer float elevations be such that the difference between the logarithms of the numbers representing said impressed pressure differentials is double the increment between successive logarithms in column B of the table given above, since the quantity of a fluid flowing through an orifice in a conduit varies as the square root of the pressure differential transmitted to the manometer D. For example, if, as well may be the case, a pressure differential equal to 2 inches of mercury is required to produce the maximum change in level of the float G when the valve O is open, the pressure differentials in inches of mercury required for maximum change in float elevations with the valve O closed, and with the manometer adjustment parts $E^2$, $E^3$, $E^4$, etc. in use successively, are given in column G of the following table, column F of which contains the common logarithms of the numbers in the column G, and column E indicates the adjustment parts used.

| E | F | G |
|---|---|---|
|  | .30103 | 2.000 |
| $E^2$ | .50103 | 3.170 |
| $E^3$ | .70103 | 5.024 |
| $E^4$ | .90103 | 7.962 |
| $E^5$ | 1.10103 | 12.260 |
| $E^6$ | 1.30103 | 20.000 |

If with apparatus proportioned in accordance with the principles and examples given above, it be found that in some particular installation the maximum flow through the conduit A will create a differential between the pressures at the opposite sides of the orifice plate used which is more than 5.024, and less than 7.962 inches of mercury, the manometer D should have inserted in it the tubular part $E^4$ so that with the maximum flow through the conduit, the maximum practical displacement in level of the float G will be produced. If the actual flow through the conduit A, creating the pressure difference of not less than 5.024 and not more than 7.962 inches of mercury, is not greater than 501.2 pounds per minute, say, but is more than 398.1 pounds per minute, columns A and C of the first table given above shows that the record chart $R^3$ should then be used in the recorder L. In any installation in which as a result of the smaller size of the conduit A and of the orifice plate $B'$ used therein, there is transmitted to the manometer D a pressure differential of not less than 5.024 and not more than 7.962 inches of mercury, with a maximum flow of not more than 251.2 and not less than 199.5 pounds per minute, the tubular manometer part $E^4$ will be used as in the first illustration, but, as indicated by columns A and C of the first table given above the chart then to be used will not be the chart $R^3$, but the chart $R^5$. If, for further example, with a larger conduit A and orifice plate B', the maximum expected flow through the conduit is not more than 7943 and not less than 6310 pounds per minute, and that flow results in impressing a pressure differential on the manometer of not more than 20 and not less than 12.26 inches of mercury, then it can be readily determined from the tables given above that the tubular part $E^6$ should be used in the manometer D, and that the chart to be used in the instrument L, is the chart $R^{20}$, or rather, in practice, the chart used is the chart $R^{10}$ modified by the addition of a cypher at the right hand end of each of the flow value markings on the chart $R^{10}$.

With any given pressure differential at opposite sides of the orifice plate B', the actual rate of flow through the conduit A, measured in pounds or cubic feet per minute or in any other suitable flow units, depends upon the density of the fluid flowing, and upon the diameter of the orifice B in orifice plate B'. In order, therefore, that the same manometer D and the same recorder L may be used in measuring and recording flows differing greatly in magnitude, in direct or readily readable units, it is not only necessary to provide a plurality of manometers, or manometer adjustments, and a plurality of record charts $R'$, $R^2$, $R^3$, etc. adapted for interchangeable use in the recorder L, but it is also necessary to provide a series of orifice plates B', having orifices B of different diameters to adapt the manometer and recorder to use with conduits A of different diameters and with fluids of various densities.

While for a complete line of flow meters a considerable number of orifice plates with orifices of different diameters are required, as illustrated by examples given above, orifices B of the same diameter may be employed in different installations in which the maximum flows are quite different and in which different combinations of manometers and record charts ($R'$, $R^2$, or $R^3$, etc). are required to form meter units best adapted for use in the installation in which they are respectively used.

In practice the selection of the size of the orifice B, and consequently the manometer range or adjustment to be employed in any particular installation ordinarily depends upon a preliminary and frequently inaccurate estimate of the maximum rate of flow. With a fluid of given density flowing through a pipe of given diameter at some assumed maximum rate any one of a series of definite orifice sizes will give correct readings provided that with each such size the proper one of a corresponding number of manometer ranges is employed. The actual orifice size selected for the proposed installation ordinarily will be one which is large enough to avoid objectionable head loss with the expected maximum rate of flow and small enough to avoid objectionable inaccuracy. It is relatively simple and easy to select from stock or to cut an orifice plate having any desired orifice diameter, but in general it is quite inconvenient in practice to change an orifice plate after it has once been installed in the steam or other pipe in which it is to be used, and it is one of the advantages of the present invention that an orifice plate once installed does not have to be replaced even though the maximum flow through the pipe in which it is installed is found to be quite different from that originally estimated. In such case all that is required when the maximum flow is found to be different from that originally estimated, is to insert in the manometer the particular part $E'$, $E^2$, $E^3$, etc. which with the maximum actual rate of flow will give the maximum practical change in elevation of the manometer float G, and to insert in the recording instrument the chart which in accordance with the principles already explained will then give correct flow readings.

In practice, moreover, in many installations the conditions may be such that the maximum value of the flow through a particular conduit may be very different during different periods each of which may be quite prolonged and in such cases the manometer adjustment and record chart scale range employed may be varied with advantage from time to time. For instance, in some plants the steam consumption is several times as great in the winter time as in the summer time. In such installations, suitable manometer adjustments may frequently be secured by simply opening and closing the corresponding valve O.

Flow meters with which the principles of the present invention may be employed with especial advantage, are largely used in measuring rates of steam flow. It will be observed that the manometer forming a part of the flow meter shown in Fig. 1 is a differential pressure measuring device in which the movable septum between the high and low pressure chambers $d$ and $d'$ formed, in the construction illustrated, by the sealing liquid mercury body, affords a measure of the difference between the pressures in said chambers by virtue of the movements which the displacements of the sealing liquid give to the float G and the magnetic core M which it carries. By the use of the described adjusting provisions including the valve O and the replaceable tubes $E^2$, $E^3$, etc., a substantially common maximum elevation of the sealing liquid level in the chamber $d$ and of the float G may be produced by each of a series of flow rates giving rise to different differences between the pressures in the chambers $d$ and $d'$. By proportioning the adjusting provisions as has been described, so that the common logarithms of said flow rates successively increase by similar fractional increments, it is possible to exhibit, i. e., indicate or record, the variations in flow with each adjustment of the manometer on an appropriate one of the previously described series of scale charts $R'$, $R^2$, etc., which are of similar dimension, each being of substantially the same diameter as each of the others. Differences in the prevailing density of the steam in the different installations result from the fact that different steam pressures and degrees of superheat are employed in different installations. Variations in fluid density change the values of the orifice sizes in the series of orifice plates required for a given pipe size. Except as a result of changes in fluid density, only a single fixed series of standard orifice sizes are required for any given pipe size.

The parts $E^2$, $E^3$, $E^4$, etc. may obviously be made in various ways and of various materials. Advantageously, they are made of some material which is not corroded by the sealing liquid. If the latter be mercury, the parts $E^2$, $E^3$, $E^4$, etc. may be made of iron or bakelite, or of an alloy consisting of approximately 80% nickel and 20% chromium. The outer walls of the mercury spaces in the legs $d$ and $d'$, and particularly in the leg $d$, may well be provided with a lining $d^{10}$ of similar non-corrosive material.

While increasing the number of scaled charts $R'$, $R^2$, $R^3$, etc. in each series increases approximation to the ideal of full scale range operation obtainable in a multiplicity of installations in which the operating conditions vary, the scale range steps between successive charts are close enough for ordinary practical purposes with ten charts in a series, and it is desirable, of course, from the standpoint of simplicity to keep the number of charts in a series relatively small.

While in accordance with the provisions of the statutes I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:—

1. In a flow meter, the combination with a manometer body comprising one manometer leg and a seat for a second manometer leg, an exhibitor and means whereby said exhibitor may be actuated by and in accordance with manometer sealing liquid level displacement, said exhibitor having a scale support, of a series of manometer leg tube parts of different cross sectional areas, means whereby said tube parts may be interchangeably mounted in said manometer body seat, a series of scale parts of different scale values, and means whereby said scale parts may be interchangeably mounted on said scale support, the ratio of the maximum scale values of each two successive scale parts of the series of such parts being constant and the cross sectional areas of said tube parts being so proportioned that the ratio of the pressure differential required to produce a given sealing liquid level displacement with one tube part seated in said body to that required when the tube part of next larger cross sectional area of said series of tube parts is seated in said body is equal to the square of the first mentioned ratio.

2. In a flow meter, the combination with a pressure responsive device including a seat for a replaceable adjustment part, an exhibitor and means whereby said exhibitor may be actuated by said device, said exhibitor having a scale support, of a series of adjustment parts, means whereby said parts may be interchangeably mounted in said device seat, a series of scale parts of different maximum scale values and means whereby said scale parts may be interchangeably mounted on said scale support, the ratio of the scale values of each two successive scale parts of the series of such parts being constant, and the different adjustment parts of the series of such parts being so proportioned that the ratio of the pressure required for a given exhibitor actuation when said device includes one of said adjustment parts to that required when said device includes the next part in the series of such adjustment parts is constant and bears a proportionality to the first mentioned ratio determined by the law relating the pressure acting on the device to the flow measured.

3. A flow meter including a manometer adapted to have impressed on it a pressure differential which is a function of the flow to be measured and comprising an element moved by and in correspondence with variations in the pressure differential impressed on the manometer, and means for adjustment of said manometer in a series of adjustment steps which thereby so vary said proportion that the pressures required to produce a given extent of element movement with any two successive adjustment steps of said series are in a predetermined and constant ratio, and an exhibit or comprising an actuating member given movements by and proportional to the movements of said element, and means cooperating with said member to give scale values to the movements of the latter, and means for adjustment of said exhibitor in a series of adjustment steps so related that the scale values given by any particular extent of movement of said member with any two successive adjustment steps of said series are in a predetermined and constant ratio related to the first mentioned ratio in a manner dependent on the character of said function.

4. A flow meter including a manometer adapted to have impressed on it a pressure differential which is a function of the flow to be measured and comprising an element moved by and in correspondence with variations in the pressure differential impressed on the manometer, and means for adjustment of said manometer in a series of adjustment steps which thereby so vary said proportion that the pressures required to produce a given extent of element movement with any two successive adjustment steps of said series are in a predetermined and constant ratio, and an exhibitor comprising an actuating member given movements by and proportional to the movements of said element, and means cooperating with said member to give scale values to the movements of the latter, and means for adjustment of said exhibitor in a series of adjustment steps so related that the scale values given by any particular extent of movement of said member with any two successive adjustment steps of said series are in a predetermined and constant ratio such that the difference between the common logarithms of the numbers representing the said scale values with any two successive adjustment steps last mentioned is equal to unity divided by a whole number, and related to the first mentioned ratio in a manner dependent on the character of said function.

Signed at Philadelphia, in the county of Philadelphia, and State of Pennsylvania, this 30th day of July, A. D. 1926.

THOMAS R. HARRISON.